United States Patent
Nakamura

(10) Patent No.: US 10,766,112 B2
(45) Date of Patent: Sep. 8, 2020

(54) MACHINE-TOOL SPINDLE COOLING METHOD AND MACHINE TOOL

(71) Applicant: MITSUBISHI HEAVY INDUSTRIES MACHINE TOOL CO., LTD., Ritto-shi, Shiga (JP)

(72) Inventor: Shingo Nakamura, Tokyo (JP)

(73) Assignee: MITSUBISHI HEAVY INDUSTRIES MACHINE TOOL CO., LTD., Ritto-Shi, Shiga (JP)

(*) Notice: Subject to any disclaimer, the term of this patent is extended or adjusted under 35 U.S.C. 154(b) by 236 days.

(21) Appl. No.: 15/556,479

(22) PCT Filed: Mar. 10, 2016

(86) PCT No.: PCT/JP2016/057491
§ 371 (c)(1),
(2) Date: Sep. 7, 2017

(87) PCT Pub. No.: WO2016/143838
PCT Pub. Date: Sep. 15, 2016

(65) Prior Publication Data
US 2018/0043491 A1    Feb. 15, 2018

(30) Foreign Application Priority Data
Mar. 10, 2015   (JP) .................. 2015-046632

(51) Int. Cl.
B23Q 11/12   (2006.01)
B23Q 5/10    (2006.01)

(52) U.S. Cl.
CPC .............. *B23Q 11/127* (2013.01); *B23Q 5/10* (2013.01); *B23Q 2220/006* (2013.01)

(58) Field of Classification Search
None
See application file for complete search history.

(56) References Cited

U.S. PATENT DOCUMENTS

| | | | |
|---|---|---|---|
| 6,913,390 B2 * | 7/2005 | Inoue | B23Q 1/40 384/321 |
| 2004/0013335 A1 | 1/2004 | Inoue et al. | |
| 2008/0078620 A1 | 4/2008 | Yanohara | |

FOREIGN PATENT DOCUMENTS

| | | |
|---|---|---|
| CN | 203526563 U | 4/2014 |
| CN | 2035266563 U | 6/2014 |

(Continued)

OTHER PUBLICATIONS

International Preliminary Report on Patentability and Written Opinion of the International Searching Authority (forms PCT/IB/373, PCT/ISA/237 and PCT/IB/338), dated Sep. 21, 2017, for International Application No. PCT/JP2016/057491, with an English translation of the Written Opinion.

(Continued)

*Primary Examiner* — Hemant Desai
*Assistant Examiner* — Tanzim Imam
(74) *Attorney, Agent, or Firm* — Birch, Stewart, Kolasch & Birch, LLP

(57) ABSTRACT

An object is to provide a machine-tool spindle cooling method and a machine tool capable of suppressing thermal deformation of a spindle while achieving energy saving. To achieve it, a machine-tool spindle cooling method is provided in which bearings (13) and a spindle rotation motor (14) that generate heat with rotation of a spindle (12) are cooled by causing a spindle cooling device (18) to supply and circulate cooled cooling oil inside a housing (11) rotatably supporting the spindle (12), the method comprising deactuating the spindle cooling device (18) to thereby stop supplying the cooling oil in a case where the number of revolutions of the spindle (12) is less than or equal to a predetermined number of revolutions and the temperatures of the bearings (13) and the spindle rotation motor (14)

(Continued)

detected by temperature sensors (15, 16) are less than or equal to a predetermined temperature.

3 Claims, 3 Drawing Sheets

(56) References Cited

FOREIGN PATENT DOCUMENTS

| | | | |
|---|---|---|---|
| JP | S56134153 A | * | 10/1981 |
| JP | 7-94099 B2 | | 10/1995 |
| JP | H0794099 B2 | * | 10/1995 |
| JP | 2001-300834 A | | 10/2001 |
| JP | 2003-53632 A | | 2/2003 |
| JP | 2008-87117 A | | 4/2008 |
| JP | 2010-23158 A | | 2/2010 |
| JP | 2011-179757 A | | 9/2011 |
| JP | 2013-86214 A | | 5/2013 |
| KR | 10-2014-0079176 A | | 6/2014 |
| WO | WO 03/016733 A1 | | 2/2003 |

OTHER PUBLICATIONS

International Search Report (forms PCT/ISA/210 and PCT/ISA/220), dated Apr. 5, 2016, for International Application No. PCT/JP2016/057491, with an English translation.

\* cited by examiner

MACHINE-TOOL SPINDLE COOLING METHOD AND MACHINE TOOL

TECHNICAL FIELD

The present invention relates to a machine-tool spindle cooling method and a machine tool which cool a spindle to suppress its thermal deformation.

BACKGROUND ART

Generally, on machine tools, a spindle is rotatably supported inside a housing through a plurality of bearings, and that spindle can be rotated by actuating a motor. Thus, as such a machine tool starts to operate, the motor is rotationally actuated and the bearings are rotated, so that they generate heat themselves. The heat generated in them is then transmitted to the spindle, thereby causing thermal deformation (thermal expansion) of the spindle. When such thermal deformation of the spindle occurs, the position of the edges of the tool mounted to this spindle is displaced, which greatly affects the machining accuracy.

In view of this, machine tools have heretofore been provided with a spindle cooling device for cooling their spindles. This spindle cooling device supplies and circulates cooling oil around the spindle to cool the spindle, and also causes the cooling oil in the middle of the circulation to exchange heat with coolant gas to maintain the temperature of that cooling oil at a predetermined temperature. A spindle cooling device for a machine tool as above is disclosed in Patent Document 1, for example.

PRIOR ART DOCUMENT

Patent Document

Patent Document 1: Japanese Patent Application Publication No. 2001-300834

SUMMARY OF THE INVENTION

Problem to be Solved by the Invention

Here, a conventional spindle cooling device includes pumps for circulating cooling oil, a compressor for compressing coolant gas, a fan for causing the coolant gas to dissipate heat, and the like, and these operate with actuation of their respective individual motors. Meanwhile, some of the motors are controlled at a fixed number of revolutions, and some have their number of revolutions inverter-controlled according to the magnitude of the load. In the conventional spindle cooling device, at least one motor among these motors is always actuated with operation of the machine tool.

Specifically, when the machine tool starts to operate, the spindle cooling device starts to be actuated together, and the spindle cooling device will not be deactuated until the operation of the machine tool is stopped. For this reason, in the conventional spindle cooling device, one or more motors are always actuated even when the temperature of the spindle is not so high and does not affect the machining accuracy. Thus, electric power might be consumed more than necessary.

Thus, the present invention has been made to solve the above problem, and an object thereof is to provide a machine-tool spindle cooling method and a machine tool capable of suppressing thermal deformation of a spindle while achieving energy saving.

Means for Solving the Problem

A machine-tool spindle cooling method according to a first aspect of the invention for solving the above problem is a machine-tool spindle cooling method in which a heat source that generates heat with rotation of a spindle is cooled by causing a spindle cooling device to supply and circulate cooled cooling liquid inside a housing rotatably supporting the spindle, characterized in that the method comprises deactuating the spindle cooling device to thereby stop supplying the cooling liquid in a case where the number of revolutions of the spindle is less than or equal to a predetermined number of revolutions and a temperature of the heat source detected by temperature detecting means is less than or equal to a predetermined temperature.

A machine-tool spindle cooling method according to a second aspect of the invention for solving the above problem is characterized in that switching of the spindle cooling device between an actuated state and a deactuated state is not performed until a certain period of time elapses after switching to the actuated state or the deactuated state.

A machine tool according to a third aspect of the invention for solving the above problem is characterized in that the machine tool comprises: a spindle rotatably supported inside a housing through a plurality of bearings; a spindle rotation motor that rotates the spindle; a spindle cooling device that cools the bearings and the spindle rotation motor generating heat with rotation of the spindle, by supplying and circulating cooling liquid inside the housing; temperature detecting means for detecting at least one temperature among a temperature of the bearings and a temperature of the spindle rotation motor; and a control device that deactuates the spindle cooling device in a case where the number of revolutions of the spindle is less than or equal to a predetermined number of revolutions and the temperature detected by the temperature detecting means is less than or equal to a predetermined temperature.

Effect of the Invention

Thus, according to the machine-tool spindle cooling method and the machine tool according to the present invention, the spindle cooling device is deactuated to thereby stop supplying the cooling liquid in the case where the number of revolutions of the spindle is less than or equal to the predetermined number of revolutions and the temperature detected by the temperature detecting means is less than or equal to the predetermined temperature. Thus, it is possible to suppress thermal deformation of the spindle while making the spindle cooling device less energy consuming.

MODE FOR CARRYING OUT THE INVENTION

A machine-tool spindle cooling method and a machine tool according to the present invention will be described below in detail with reference to the drawings.

Embodiment

Figure 1:
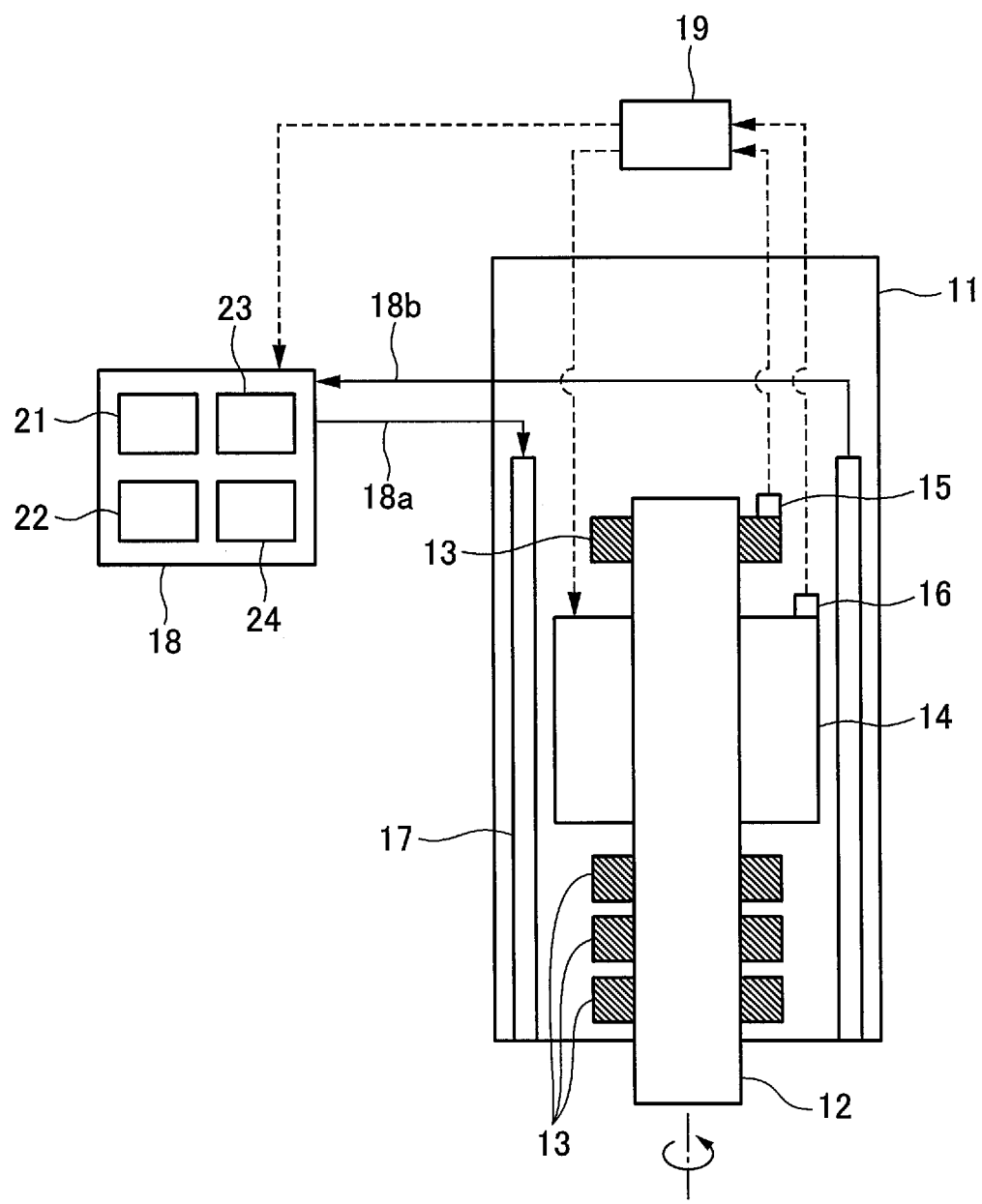
FIG. 1 is a schematic configuration diagram of a machine tool employing a spindle cooling method according to one embodiment of the present invention.

As illustrated in FIG. 1, inside a housing (tool body) 11 of a spindle head of a machine tool, a spindle 12 is rotatably supported through a plurality of bearings 13. Moreover, a spindle rotation motor 14 is provided on the spindle 12 on the outer side in the radial direction of the spindle. Thus, the spindle 12 can be rotated by actuating the spindle rotation motor 14.

Also, a temperature sensor (temperature detecting means) 15 is attached to at least one bearing 13 among the plurality of bearings 13, and a temperature sensor (temperature detecting means) 16 is attached to the spindle rotation motor 14.

Thus, by actuating the spindle rotation motor 14, the spindle 12 is rotated, and this rotation of the spindle 12 causes generation of heat not only at the spindle rotation motor 14 for rotating the spindle 12 but also at the bearings 13 for rotatably supporting the spindle 12. Moreover, to the bearing 13 and the spindle rotation motor 14, which become heat sources as described, the temperature sensors 15, 16 for detecting their temperatures are attached.

Further, inside the housing 11, a cylindrical cooling jacket 17 is provided outward of the bearing 13 and the spindle rotation motor 14 in the radial direction of the spindle. Cooling oil (cooling liquid) is to be supplied into and circulated through a hollow inner portion of this cooling jacket 17.

On the other hand, the machine tool is provided with a spindle cooling device 18. This spindle cooling device 18 includes a cooling-oil supply pipe 18a and a cooling-oil return pipe 18b, and these cooling-oil supply pipe 18a and cooling-oil return pipe 18b communicate with the hollow inner portion of the cooling jacket 17.

Thus, the spindle cooling device 18 cools the bearings 13 and the spindle rotation motor 14 by supplying the cooling oil into the cooling jacket 17 and circulating the cooling oil therethrough via the cooling-oil supply pipe 18a and the cooling-oil return pipe 18b, and indirectly cools the spindle 12 through the these bearings 13 and spindle rotation motor 14. Consequently, thermal deformation (thermal expansion) of the spindle 12 attributable to the heat generation of the bearing 13 and the spindle rotation motor 14 is suppressed.

In doing so, the cooling oil flowing inside the cooling-oil supply pipe 18a exchanges heat with coolant gas at a heat exchanger provided at a given portion along the cooling-oil supply pipe 18a to be kept at a predetermined temperature, and then flows into the cooling jacket 17.

Thus, the spindle cooling device 18 not only includes a supply pump (discharge pump) provided on the cooling-oil supply pipe 18a and a return pump (suction pump) provided on the cooling-oil return pipe 18b but also a coolant-gas circulation path for circulating the coolant gas, a compressor for compressing the coolant gas, a fan for causing the coolant gas to dissipate heat, and the like. Moreover, the pumps, the compressor, and the fan operate with their respective individual motors 21, 22, 23, 24.

Also, the machine tool is provided with an NC device (control device) 19 for performing integrated control on the machine tool. This NC device 19 can receive machining conditions such as the shape of the workpiece, the diameter of the tool, the amount of cut, the feed speed, the number of revolutions of the spindle, heavy cutting, light cutting, and so forth, and the spindle rotation motor 14, the temperature sensors 15, 16, and the motors of the spindle cooling device 18 are connected thereto. Thus, the NC device 19 controls the actuation of the spindle rotation motor 14 and the spindle cooling device 18 according to machining conditions, and the temperature sensors 15, 16 can output the temperatures they detect to the NC device 19.

Given the above, the NC device 19 controls the actuation of the spindle cooling device 18 during operation of the machine tool according to the number of revolutions of the spindle 12, the temperature of the bearing 13, and the temperature of the spindle rotation motor 14. Moreover, in this actuation control, the NC device 19 puts the spindle cooling device 18 into an energy saving mode in which all the motors in the spindle cooling device 18 are deactuated, in a case where the number of revolutions of the spindle 12 is less than or equal to a predetermined number of revolutions and the temperatures of the bearing 13 and the spindle rotation motor 14 detected by the temperature sensors 15, 16 are less than or equal to a predetermined temperature.

For example, for a machine tool whose maximum number of revolutions of the spindle 12 is 6000 min−1, when the number of revolutions of the spindle 12 is less than or equal to 1000 min−1 and the temperatures detected by the temperature sensors 15, 16 are less than or equal to 50° C., the amounts of heat generation and thermal deformation of the spindle 12 are so small that they are not considered to result in deterioration of the machining accuracy and damage on the spindle 12 (damage on the tool). Hence, all the motors in the spindle cooling device 18 are deactuated. By controlling the actuation of the spindle cooling device 18 according to the number of revolutions of the spindle 12, the temperature of the bearing 13, and the temperature of the spindle rotation motor 14 as described above, it is possible to suppress thermal deformation of the spindle 12 while making the spindle cooling device 18 less energy consuming.

Specifically, although it is possible to use only the number of revolutions of the spindle 12 to control the actuation of the spindle cooling device 18, the amount of heat generation of the spindle 12 (the amounts of heat generation of the bearings 13 and the spindle rotation motor 14) is greatly different between heavy cutting and light cutting even when the number of revolutions of the spindle 12 is the same. For this reason, it is necessary to use not only the number of revolutions of the spindle 12 but also the temperatures of the bearing 13 and the spindle rotation motor 14, which are factors of thermal deformation of the spindle 12, in controlling the actuation of the spindle cooling device 18.

Note that heavy cutting refers to a cutting process in which the amount of cut, the feed speed, the diameter of the tool, and the like are relatively large. On the other hand, light cutting refers to a cutting process in which the number of revolutions, the amount of cut, the feed speed, and the diameter of the tool are relatively small.

Thus, even under a low-speed rotation condition where the number of revolutions of the spindle 12 is less than or equal to the predetermined number of revolutions, if heavy cutting is performed, it is possible to prevent deterioration of the machining accuracy and damage on the spindle 12 by monitoring the temperatures of the bearing 13 and the spindle rotation motor 14 detected by the temperature sensors 15, 16.

Also, even under a low temperature condition where the temperatures of the bearings 13 and the spindle rotation motor 14 are less than or equal to the predetermined temperature, if heavy cutting is performed, it is possible to prevent deterioration of the machining accuracy and damage on the spindle 12 by monitoring the number of revolutions of the spindle 12 since the temperature of the bearings 13 and the temperature of the spindle rotation motor 14 do not instantly follow a change in the number of revolutions of the spindle 12.

Further, the spindle cooling device 18 is in a deactuated state when the number of revolutions of the spindle 12 is less than or equal to the predetermined number of revolutions and the temperatures of the bearing 13 and the spindle rotation motor 14 detected by the temperature sensors 15, 16 are less than or equal to the predetermined temperature. For this reason, there are cases where the number of revolutions of the spindle 12 and the detected temperatures of the bearing 13 and the spindle rotation motor 14 are stable at the boundary between this deactuated state and the actuated state. Thus, controlling the actuation of the spindle cooling device 18 in response to subtle changes in number of revolutions and temperature might not only make proper cooling and stopping of the cooling impossible but also cause noise and failure of the device.

In view of this, switching of the actuation control on the spindle cooling device 18, i.e. switching of the spindle cooling device 18 between the actuated state and the deactuated state is not performed until a certain period of time elapses after switching to the actuated state or the deactuated state. In this way, it is possible to stably adjust the cooling performance and also prevent noise and failure of the device.

In the above embodiment, the temperatures of the bearing 13 and the spindle rotation motor 14, which become heat sources, are detected and both of the detected temperatures are used to control the actuation of the spindle cooling device 18. Note, however, that only one temperature among the temperatures of the bearing 13 and the spindle rotation motor 14 may be used instead.

Also, regarding where to install a temperature sensor(s), the temperature sensors 15, 16 may be attached to the bearing 13 and the spindle rotation motor 14, as in the above embodiment, in a case where preventing damage on the spindle 12 is priority. On the other hand, a temperature sensor may be provided inside the housing 11 in a case where preventing thermal deformation of the tool body (housing 11) is priority.

Next, the control on the actuation of the spindle cooling device 18 will be described in detail using FIG. 2 and FIG. 3.

Figure 2:
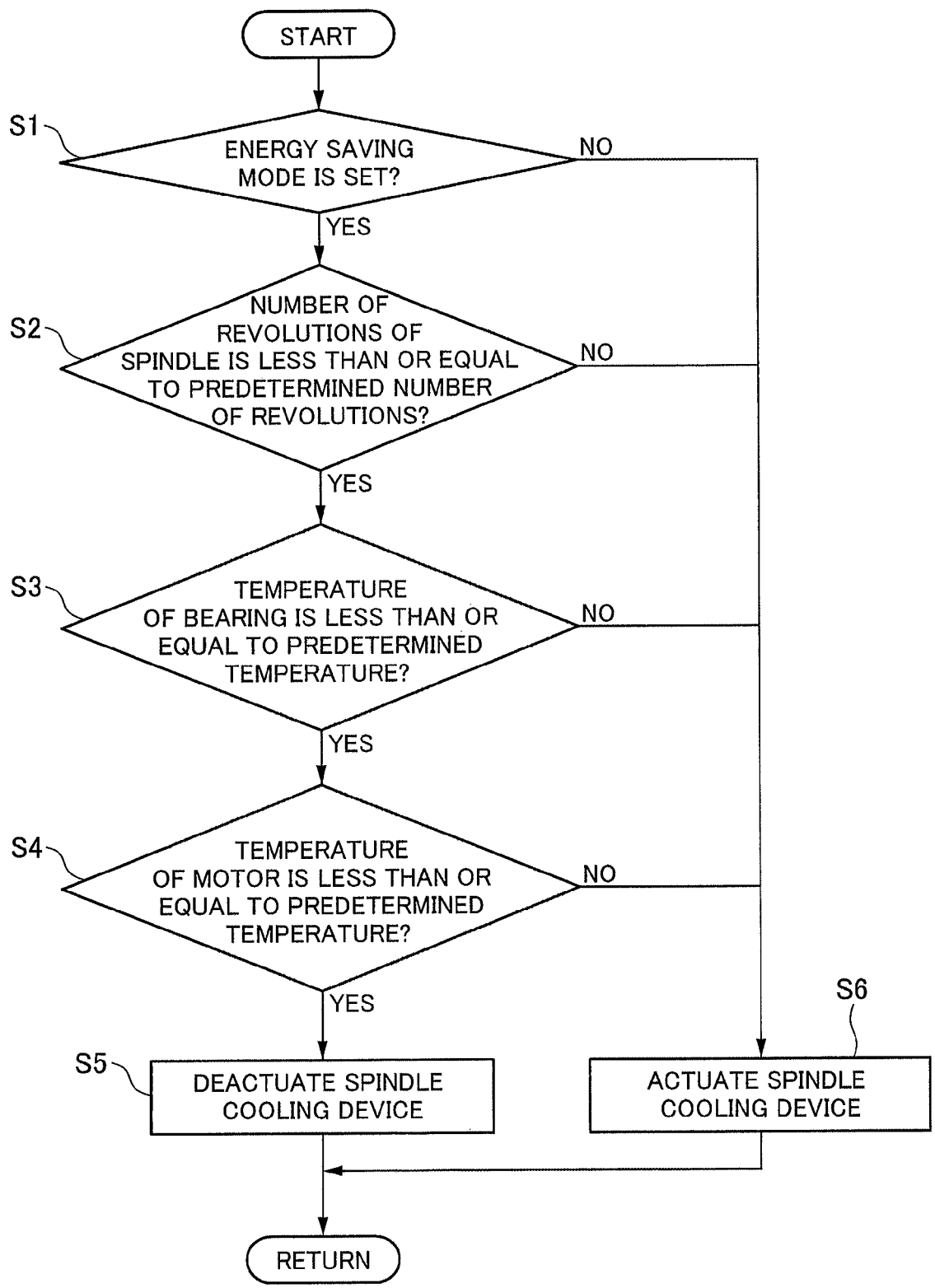
FIG. 2 is a flowchart describing the spindle cooling method according to the one embodiment of the present invention.

As illustrated in FIG. 2, firstly in step S1, it is determined whether or not the energy saving mode is set. Here, if the energy saving mode is set, the process proceeds to step S2. On the other hand, if the energy saving mode is not set, the process proceeds to step S6.

Then in step S2, it is determined whether or not the number of revolutions of the spindle 12 is less than or equal to the predetermined number of revolutions. Here, if the number of revolutions of the spindle 12 is less than or equal to the predetermined number of revolutions, the process proceeds to step S3. On the other hand, if the number of revolutions of the spindle 12 is greater than the predetermined number of revolutions, the process proceeds to step S6.

Then in step S3, it is determined whether or not the temperature of the bearing 13 detected by the temperature sensor 15 is less than or equal to the predetermined temperature. Here, if the temperature of the bearing 13 is less than or equal to the predetermined temperature, the process proceeds to step S4. On the other hand, if the temperature of the bearing 13 is greater than the predetermined temperature, the process proceeds to step S6.

Then in step S4, it is determined whether or not the temperature of the spindle rotation motor 14 detected by the temperature sensor 16 is less than or equal to the predetermined temperature. Here, if the temperature of the spindle rotation motor 14 is less than or equal to the predetermined temperature, the process proceeds to step 95. On the other hand, if the temperature of the spindle rotation motor 14 is greater than the predetermined temperature, the process proceeds to step S6.

Then in step S5, all the motors in the spindle cooling device 18 are deactuated, and the process is then continued. On the other hand, in step S6, all the motors in the spindle cooling device 18 are actuated, and the process is then continued.

As described above, when the amount of heat generation of the spindle 12 is small, the energy saving mode is executed, thereby deactuating all the motors in the spindle cooling device 18. In this way, the spindle cooling device 18 can be made less energy consuming.

This point will be described using FIG. 3. Note that FIG. 3 illustrates time-series changes in power consumption of the spindle cooling device 18, and indicates power consumption in the case of employing the spindle cooling method according to the present invention with a solid line while indicating power consumption in a case of employing a conventional spindle cooling method with a broken line.

Figure 3:
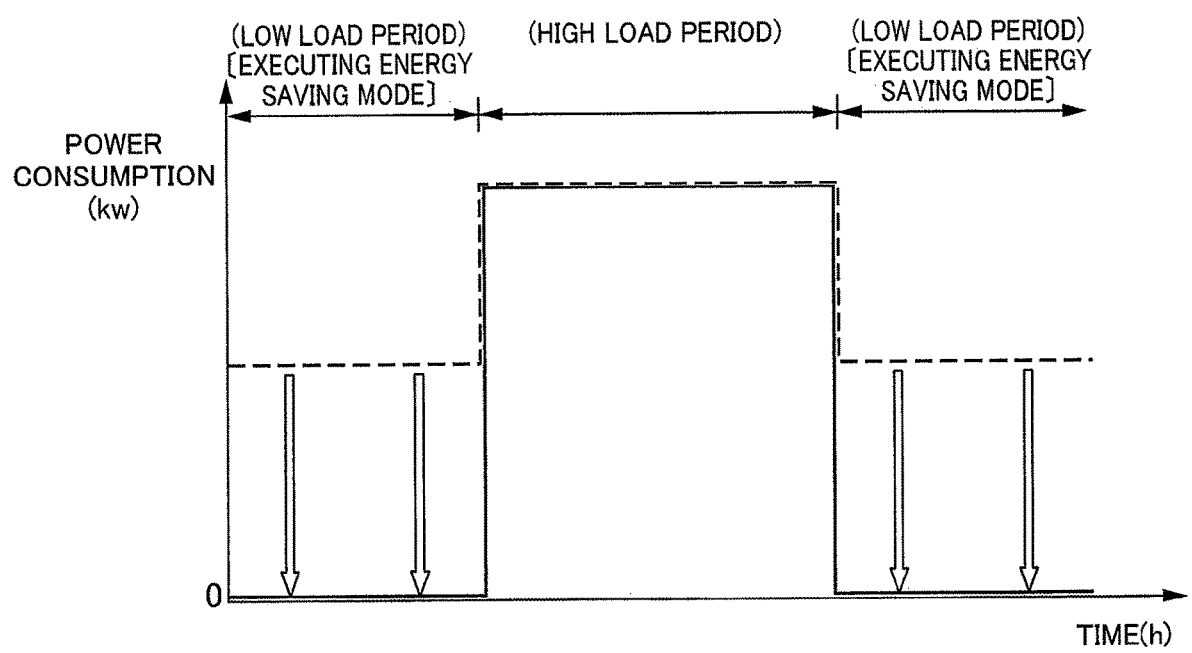
FIG. 3 is a time chart illustrating time-series changes in power consumption of a spindle cooling device.

Specifically, as illustrated in FIG. 3, in the spindle cooling method according to the present invention, all the motors in the spindle cooling device 18 are actuated during a high load period when the amount of heat generation of the spindle 12 is large, whereas the energy saving mode, in which all the motors in the spindle cooling device 18 are deactuated, is executed during a low load period when the amount of heat generation of the spindle 12 is small.

Thus, in a high load period, there is no significant difference in power consumption between the spindle cooling method according to the present invention and the conventional spindle cooling method. However, in a low load period, there is a significant difference in power consumption between the spindle cooling method according to the present invention and the conventional spindle cooling method. Specifically, in the spindle cooling method according to the present invention, in a low load period, the energy saving mode is executed to deactuate the spindle cooling device 18, thereby enabling reduction of the power consumption of the spindle cooling device 18 to 0 kw. Therefore, according to the present invention, it is possible to suppress thermal deformation of the spindle 12 while making the spindle cooling device 18 less power consuming.

INDUSTRIAL APPLICABILITY

The machine-tool spindle cooling method according to the present invention is capable of preventing excessive cooling of a spindle by making the cooling performance changeable, and can therefore be utilized significantly beneficially in terms of energy saving.

EXPLANATION OF THE REFERENCE NUMERALS 11 housing
12 spindle
13 bearing
14 spindle rotation motor 15, 16 temperature sensor
17 cooling jacket
18 spindle cooling device
18a cooling-oil supply pipe
18b cooling-oil return pipe
19 NC device

The invention claimed is:

1. A machine-tool spindle cooling method in which a heat source that generates heat with rotation of a spindle is cooled by causing a spindle cooling device to supply and circulate a liquid inside a housing rotatably supporting the spindle, the method comprising:
deactuating all motors in the spindle cooling device to thereby stop supplying and circulating the liquid in a case where a number of revolutions of the spindle is less than or equal to a predetermined number of revolutions and a temperature of the heat source detected by a temperature sensor is less than or equal to a predetermined temperature.

2. The machine-tool spindle cooling method according to claim 1, wherein switching of the spindle cooling device between an actuated state and a deactuated state is not performed until a certain period of time elapses after switching to the actuated state or the deactuated state.

3. A machine tool comprising:
a spindle rotatably supported inside a housing through a plurality of bearings;
a spindle rotation motor that rotates the spindle;
a spindle cooling device that cools the bearings and the spindle rotation motor generating heat with rotation of the spindle, by supplying and circulating liquid inside the housing;
a temperature sensor that detects at least one temperature among a temperature of the bearings and a temperature of the spindle rotation motor; and
a control device that deactuates all motors in the spindle cooling device so as to not supply and circulate the liquid in a case where a number of revolutions of the spindle is less than or equal to a predetermined number of revolutions and the at least one temperature detected by the temperature sensor is less than or equal to a predetermined temperature.

\* \* \* \* \*